No. 737,130. Patented August 25, 1903.

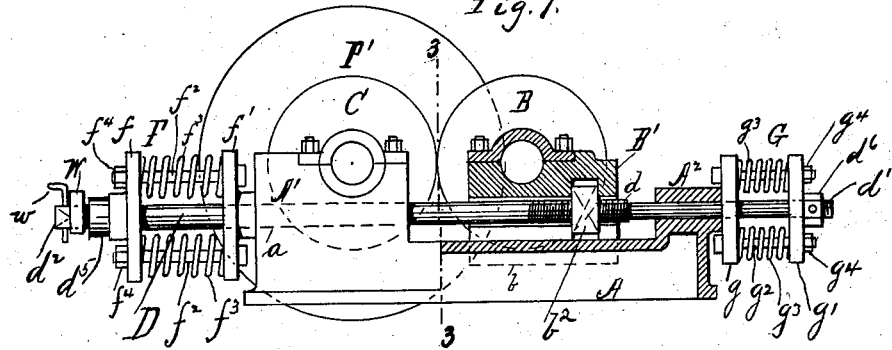
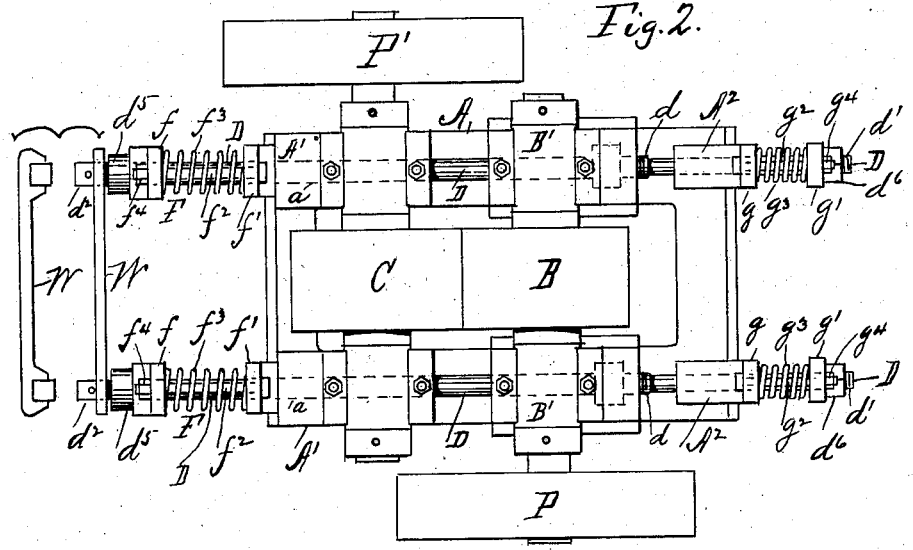
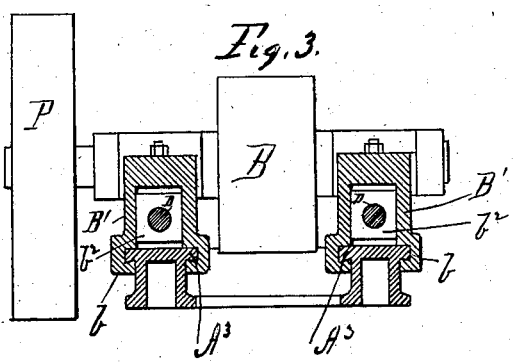

UNITED STATES PATENT OFFICE.

CYRUS W. McARTHUR AND FRANZ CAZIN, OF DENVER, COLORADO.

CRUSHING-ROLLS.

SPECIFICATION forming part of Letters Patent No. 737,130, dated August 25, 1903.

Application filed March 26, 1903. Serial No. 149,744. (No model.)

*To all whom it may concern:*

Be it known that we, CYRUS W. McARTHUR and FRANZ CAZIN, citizens of the United States, residing in the city and county of Denver, Colorado, have invented certain new and useful Improvements in Crushing-Rolls, of which the following is a specification.

Our invention relates to that class of crushing-rolls in which the two rolls lie in the same horizontal plane and one has a yielding movement with respect to the other.

The objects of the invention are to provide a simple adjustment of the movable spring-pressed roll and to provide means for cushioning the said roll in its return movement toward the other roll. These objects we accomplish by the construction shown in the accompanying drawings, in which—

Figure 1 is a side elevation, partly in section, of our improved crushing-rolls. Fig. 2 is a plan thereof, and Fig. 3 is a transverse section on line 3 3, Fig. 1.

A designates the bed of the apparatus, provided at its opposite sides near one end with fixed integral bearings $A'$ $A'$ and formed on its opposite end with longitudinally-bored guide-lugs $A^2$ $A^2$. The upper sides of the bed A are formed with guide-flanges $A^3$ $A^3$, which form a slideway for the sliding bearings $B'$ of the adjustable yielding roll B, the lower sides of these bearings being recessed to receive the said flanges $A^3$, as shown in Fig. 3 at $b$. These bearings $B'$ are further provided with longitudinal bores, which are in longitudinal alinement with the bores of the guide-lugs $A^2$ and with the bores $a$ $a$ in the fixed bearings $A'$. The bearings $B'$ are further provided with sockets $b'$, in which are inserted nuts $b^2$, (see Figs. 1 and 3,) though the bores of the bearings $B'$ may be directly threaded and the nuts $b^2$ omitted, if desired.

C is what is termed a "fixed roll" in contradistinction to the sliding or loose roll B, and this roll C is journaled in the fixed bearings A. Both rolls have belt-pulleys P $P'$ or wheels, by means of which they are rotated in opposite directions, or only the fixed roll may be provided with a pulley.

D D designate the adjusting-rods, sliding freely in the bearings $A'$ and guide-lugs $A^2$, but provided with screw-threads $d$ between their ends within the threaded parts or nuts $b^2$ of the sliding bearings $B'$. (See Fig. 1.) The ends of the rods D D extend beyond the ends of the bed A and are threaded at one end, as shown at $d'$, and squared at their other ends, as shown at $d^2$. The projecting ends of the rods pass freely through nests of springs F G, respectively. The nest of springs F comprises parallel plates $f f'$, two for each rod, apertured at their middle portions for the free passage of the rods and connected loosely by bolts $f^2 f^2$, upon which are placed spiral springs $f^3 f^3$, which are compressed and held by said bolts $f^2 f^2$ and plates $f f'$, and are further compressed by collars $d^5$ on the rods D when the roll B yields and moves away from the roll C by reason of a large piece falling between them without being crushed, the rods then moving to the right and the collars pulling against the outer plates $f$ and sliding them on their bolts $f^2$ toward the plates $f'$, which rest against the end of the bed A or the bearings $A'$ thereon. The tension of the springs will be regulated by the nuts $f^4$ on the bolts $f^2$. The proximity of the roll B to the roll C will be adjusted by rotating the rods D D, which may be done by means of a double wrench W, having sockets or jaws of the proper shape to engage the squared ends $d^2$ of said rods. The wrench W is of a length to engage both ends $d^2$ at once, and so hold the rods D from accidental rotation, the wrench being held on by means of pins $w$ or otherwise. Instead of the wrench any other locking device may be used. The nests of springs G are constructed exactly like the springs F and comprise the plates $g$ $g'$, the bolts $g^2$ $g^2$, their nuts $g^4$, and spiral springs $g^3$, and the rods have nuts $d^6$, which bear against the outer plates $g$. It follows, therefore, that when the rods D slide to the right and compress the springs F their right-hand ends will slide through the nests of springs G; but after the passage of the uncrushed mass through the rolls the rods will be forced to the left by the nests of springs F in expanding, whereupon the nuts $d^6$ will strike the outer plates $g'$ of the right-hand springs and compress them and so cushion the return movement of the loose roll B and prevent it from striking against the roll C.

By our improvements the so-called "distance-pieces" commonly employed for keeping the rolls apart are dispensed with and all shocks to the rolls are avoided.

What we claim is—

1. The combination with the bed, a roll mounted in fixed bearings, a second roll, movable bearings in which said roll is journaled, sliding adjusting-rods mounted on the frame and in threaded engagement between their ends with said movable bearings, stops on one end of said rods to limit the return movement of the movable bearing, and a spring mechanism at the opposite ends of the rods and against the action of which the movable bearings move away from the fixed bearings.

2. The combination with the bed or frame and the fixed and movable bearings and the rolls journaled therein, of adjusting-rods extending longitudinally through portions of the bed or frame and in threaded engagement between their ends with the movable bearings to adjust them with relation to the stationary bearings, and spring mechanisms at one end of the rods to permit the movable bearing and its roll to yield and return the same to normal position, and cushioning mechanism between the frame and the opposite ends of the rods to cushion their return movement.

3. The combination with the bed or frame, the fixed and movable bearings, and the rolls journaled therein, of longitudinally-sliding adjusting-rods mounted on the bed or frame and in threaded engagement with the movable bearings, a pair of loose plates on both ends of each rod, a pair of bolts adjustably connecting each pair of plates, a spiral spring on every bolt, and abutments on the outer ends of the rods engaging the outer plates of every pair.

4. The combination with the frame having fixed and movable bearings, and rolls mounted in said bearings, of sliding rods connected adjustably between their ends with the movable bearings, springs at one end of the rods to yieldingly hold the movable bearing up toward the fixed bearing and cushioning mechanism at the opposite ends of the rods to cushion the return movement of the parts.

5. The combination with the bed having fixed bearings, provided with longitudinal guide-openings, guide-lugs at the opposite ends of the bed, movable bearings also having longitudinal openings and threaded portions, and rolls mounted in said bearings, of adjusting-rods threaded between their ends into the said movable bearings and sliding therebeyond through the guide-lugs and longitudinal guide-openings in the fixed bearings, and nests of springs on the ends of the rods and acting respectively to hold the movable bearing to its adjusted position and cushion its return movement.

In testimony whereof we affix our signatures in presence of two witnesses.

CYRUS W. McARTHUR.
FRANZ CAZIN.

Witnesses:
FRANK E. SHEPARD,
FRANK R. BYRNS.